United States Patent [19]
Rudy et al.

[11] 3,864,178
[45] Feb. 4, 1975

[54] LIQUID POLYNUCLEAR HYDROCARBYL FERROCENES

[75] Inventors: Thomas P. Rudy, Saratoga; Harry J. Hyer, Palo Alto, both of Calif.

[73] Assignee: United Aircraft Corporation, East Hartford, Conn.

[22] Filed: Mar. 29, 1968

[21] Appl. No.: 718,313

Related U.S. Application Data

[63] Continuation-in-part of Ser. No. 663,517, Aug. 28, 1967, abandoned.

[52] U.S. Cl............. 149/109.4, 149/19.1, 149/19.3, 149/19.4, 149/19.5, 149/19.6, 149/19.9, 260/439 CY, 252/431 R, 149/109.6
[51] Int. Cl....................... C07f 15/02, C06b 19/00
[58] Field of Search ............. 260/439 CY, 2 M, 67; 252/431 R, 149/109

[56] References Cited
UNITED STATES PATENTS
3,341,495   9/1967   Neuse ................................ 260/67

OTHER PUBLICATIONS
Levi, Ferrocene Polymers, U.S. Picatinny Arsenal, Dover, N.J., Plastics and Packaging Laboratory, 1966, pp. 5, 9, 13–17 and 19–21 (TP1140U6).
Watanabe et al., Bulletin Chem. Soc., Japan, Vol. 39, pp. 790–801, (1966).

*Primary Examiner*—Leland A. Sebastian
*Attorney, Agent, or Firm*—Steven F. Stone

[57] ABSTRACT

Compositions of matter consisting essentially of mixtures of polynuclear hydrocarbyl substituted ferrocene compounds, each ferrocene nucleus being substituted with at least one hydrocarbyl group, the total number of carbon atoms in the hydrocarbyl substituents of each substituted ferrocene nucleus being in the range of from 1–6, said compositions being noncrystalline, noncrystallizable liquids having an average molecular weight no greater than about 950, said compositions being miscible in all proportions in carboxyterminated polybutadiene at ambient conditions and being combustion catalysts for composite solid propellants. These compositions can be produced by free radical coupling of alkylferrocenes or by the condensation, at low temperature and in the presence of an inert diluent, of lower hydrocarbyl substituted ferrocene derivatives, said hydrocarbyl substituents having $m$ carbon atoms, with aliphatic aldehydes containing $n$ carbon atoms wherein $m$ is an integer from 1–6, $n$ is an integer from 1–12 and value of the relationship $2m + n$ is from 3–14. Dimeric and trimeric species are the most desirable.

18 Claims, No Drawings

LIQUID POLYNUCLEAR HYDROCARBYL FERROCENES

RELATED PATENT APPLICATION

This patent application is a continuation-in-part of copending, coassigned patent application, Ser. No. 663,517, filed Aug. 28, 1967, now abandoned, by Thomas P. Rudy and Harry J. Hyer for Combustion Catalysts.

BACKGROUND OF THE INVENTION

Ferrocene and alkyl ferrocene compounds have been employed as combustion catalysts for solid propellants in rocket propulsion systems requiring high burning rates. These materials are volatile solids or liquids and have a tendency to evaporate from the cured propellant during storage thereby seriously degrading the ballistic performance of the rocket motor. The volatile nature of these materials also creates extremely hazardous conditions in the preparation of solid propellants, and mixer explosions have been attributed to vapors of these materials. According to this invention, novel compositions consisting of mixtures of polynuclear ferrocene derivatives have been discovered which are noncrystalline, low vapor pressure liquids, do not tend to evaporate or migrate from propellant grains and exhibit catalytic activity at least comparable with, and in many cases better than, the prior art materials.

It is accordingly an object of this invention to provide novel non-crystalline liquid mixtures of polynuclear ferrocene derivatives.

It is another object of this invention to provide improved combustion catalysts for solid propellants.

It is another object of this invention to produce these novel liquid compositions for the free radical coupling of alkyl substituted ferrocenes.

It is another object of this invention to produce these novel liquid compositions by the condensation of a hydrocarbyl substituted ferrocene with an aldehyde.

These and other objects of this invention will be readily apparent from the following description of the invention.

DESCRIPTION OF THE INVENTION

The novel compositions of this invention consist of mixtures of polynuclear ferrocene derivatives in which at least one of the hydrogen atoms of each ferrocene nucleus is replaced by a hydrocarbyl substituent. Due to the fact that the bonds between the ferrocene nuclei and the bonds between the hydrocarbyl substituents and the ferrocene nuclei are randomly oriented in the various isomers and polymers that constitute the mixture, the end products are noncrystalline and noncrystallizable liquids. Since the viscosity of the composition tends to increase with the increase in molecular weight of the ferrocene derivatives and since the iron content of the material, which is primarily responsible for the combustion catalytic properties thereof, will tend to decrease when large numbers of carbon atoms are substituted into the ferrocene compound, the preferred embodiments of the invention employ hydrocarbyl groups in which the total number of carbon atoms substituted into each ferrocene nuclei is from 1–6 and the degree of polymerization or average molecular weight of the composition is preferably controlled to produce a product which is substantially the dimer. The novel noncrystalline liquid mixtures of polynuclear ferrocene derivatives of the invention can be produced by the condensation, in an inert diluent and at a low temperature, of a hydrocarbyl substituted ferrocene wherein the hydrocarbyl substituents have $m$ carbon atoms, with an aliphatic aldehyde having $n$ carbon atoms wherein $m$ is an integer from 1–6 $n$ is an integer from 1–12, and the value of the relationship $m + n$ is from 3–14. The crude reaction product produced by this condensation reaction is a noncrystalline, noncrystallizable liquid which exhibits catalytic activity. Viscosity of the crude reaction product is relatively high due to the presence in the reaction mixtures of varying amounts of trimer, tetramer, pentamer, and the hexamer in increasingly smaller amounts as the degree of polymerization increases. The crude reaction product can, however, be subject to distillation. The low molecular weight distillate will consist essentially of the dimer and the higher molecular weight residue will contain the higher molecular weight materials. The crude, distillate and residue exhibit catalytic activity and all are noncrystalline, noncrystallizable liquids, miscible in all proportions at ambient conditions in carboxyterminated polybutadiene, a typical polymer used to form solid propellant binders. The novel noncrystalline liquid mixtures of polynuclear ferrocene derivatives of this invention can also be produced by the free radical coupling of alkyl substituted ferrocenes in which the total number of carbon atoms in the alkyl group associated with each ferrocene nucleus is in the range of 1–6. When produced in this manner, the product is essentially in dimeric form and need not be distilled to obtain the low molecular weight species.

As noted above, the exact structures of the compositions of this invention cannot be described due to the many isomers that are present. The following general structural formulas, however, appear to be consistent with the available evidence as to structure of the polymers produced by the above described condensation reaction (Formula I) and free radical coupling reaction (Formula II).

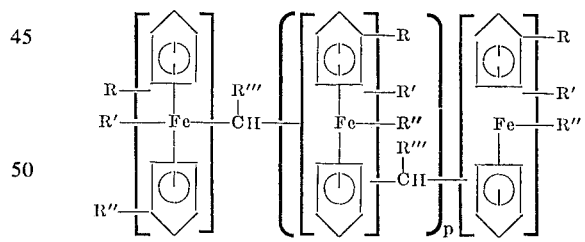

wherein R is a lower hydrocarbyl group, R' and R'' are hydrogen or lower hydrocarbyl groups, the total number of carbon atoms in R, R', and R'' being from 1–6, R''' is hydrogen or an aliphatic group having from 1–11 carbon atoms and $p$ is an integer from 0–4. When $p$ is zero, the product is the dimer. The value of $p$ should not exceed 4 and is preferably kept lower since at higher values of $p$, the viscosity of the product is too high for convenient use. The crude reaction product, however, may contain traces or low concentrations of material having higher values of $p$ without producing substantial degradation of the physical properties of the material.

Formula II

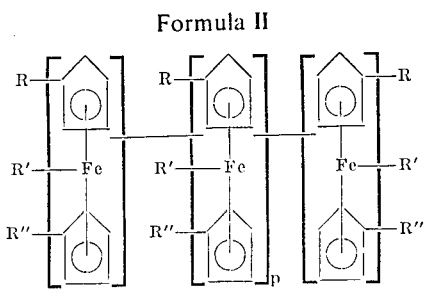

wherein R is a lower alkyl group, R' and R'' are selected from the group consisting of hydrogen and lower alkyl groups, the total number of carbon atoms in R, R' and R'' being from 1 – 6 and $p$ is an integer from 0 – 1; are noncrystalline, nonvolatile liquids which exhibit excellent activity as combustion catalysts in solid propellant compositions.

Products produced within the above limitations have an iron content high enough to produce good catalytic activity without developing undesirable crystallinity. The exact structure of the products is not known and appears to consist of a mixture of compounds of varying molecular weight and isomerism. The preferred species is the low molecular weight species wherein $p$ is 0, since the viscosity of this species is low enough to permit ready processing into solid propellant compositions. The product obtained by the free radical coupling described herein consists primarily of this dimeric species with minor amounts of trimer and only traces of higher polymers. When cooled, the liquid products of this invention do not crystallize but become increasingly viscous. The lack of crystallinity is probably due in part to the presence of various isomers which prevent development of a crystal lattice.

As noted, the exact structure of the products of this invention cannot be specifically described due to the various points of bonding of the R, R' and R'' groups as well as the bonding points of the linkage between the substituted ferrocene nuclei. However, the above structural formula is consistent with all available evidence as to structure.

For convenience, the above structural formulas can be represented as follows with the meaning of R, R' and R'' and $p$ being the same as set forth above with respect to Formulas I and II, respectively:

Formula I

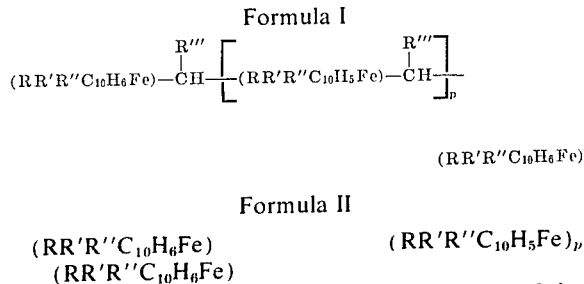

(RR'R''C$_{10}$H$_6$Fe)

Formula II (RR'R''C$_{10}$H$_6$Fe)      (RR'R''C$_{10}$H$_5$Fe)$_p$
(RR'R''C$_{10}$H$_6$Fe)

It is generally accepted that the iron content of the catalyst is responsible for the catalytic effect. It has been observed, however, that the catalysts of this invention exhibit higher activity on the basis of equivalents of iron than do the solid combustion catalysts such as ferrocene and iron oxide. This probably is due in part to the fact that the products of this invention are soluble liquids which can form molecular dispersions in the binders whereas the solid materials can only be dispersed on a particle basis. The combustion catalysts of this invention produce catalytic effects comparable with, and in some cases better than, the prior art ferrocene and liquid alkylferrocene compounds but exhibit substantially improved properties from the standpoint of safety in processing and migration or evaporation from the cured propellant. These latter properties permit storage of the propellant for extended periods of time which is a requirement in many missile systems.

The catalysts of this invention are useful in the preparation of composite solid propellant compositions. The amount of catalyst needed depends upon the burning rate desired for a particular propellant formulation. The amount is generally below about 5 percent by weight and usually in the range of from 0.1 to 3.0 percent by weight.

Composite solid propellant compositions consist basically of a cured polymeric binder loaded with particulate oxidizer materials. In addition to the oxidizer, it is also common to include particulate oxidizable materials such as aluminum, boron, and metal hydrides, for example, as well as combustion catalysts. In high performance propellants, the solids loading is generally as high as possible consistent with processing requirements and physical characteristics required of the finished grain.

Suitable binders include, while not being limited to, cured polybutadiene, polyisobutylene, polybutadiene-acrylonitrile polymers, polyvinyl chloride, polyurethanes, epoxy polymers, polyethers and polyesters. The binders may be plasticized, particularly where high solid loadings are required. Suitable plasticizers for the binders are known to the art and include, without being limited to, aliphatic esters such as dioctyl adipate and high energy nitrato esters, for example. Suitable oxidizing agents include, without being limited to, such materials as ammonium perchlorate, ammonium nitrate, potassium perchlorate and potassium nitrate.

PREPARATION BY CONDENSATION

The materials of this invention may be prepared by condensing the aforementioned ferrocene derivatives with the aforementioned aldehydes which may be supplied as either the aldehyde, per se, or in the form of the corresponding acetal. In order to obtain reasonable yields of the preferred dimeric and trimeric species, an acid catalyzed reaction is conducted in an inert liquid at low temperatures, preferably 10°C or below. Condensation reactions conducted at higher temperatures or in the absence of the inert diluent tend to produce high molecular weight polymers which are noncrystalline glassy solids.

Suitable inert diluents are known to the art and include while not being limited to dioxane, ether, and alkanoic acids having from 1–6 carbon atoms. Anhydrous conditions are preferred since higher yields are obtained. It has been discovered that when ether is used as the diluent, the inclusion of small amounts of ethanol produces unexpectedly higher yields of dimer.

Suitable acid catalysts are known to the art and include acids having a pKa of not more than 1.5 such as sulphuric acid, hydrobromic acid, hydrochloric acid, hydrofluoric acid, phosphoric acid, p-toluenesulfonic acid, and trichloroacetic acid. Aprotonic Lewis acids such as AlCl$_3$, ZnCl$_2$, and P$_2$O$_5$ may also be employed.

The preparation and use of the materials of this invention will be apparent from the following examples:

EXAMPLE I

A solution of 242 gm (1.0 mole) of n-butylferrocene, 38 gm (0.5 mole) of methylal and 750 ml anhydrous diethyl ether was prepared in a 2-liter, 3-necked, round-bottomed flask fitted with a stirrer, a reflux condenser and a 250 ml dropping funnel. The flask and its contents were cooled in an ice-water bath to 10°C. Vigorous stirring was maintained while 222 ml (4 moles) of concentrated sulfuric acid Sp. Gr. 1.84, 18 molar) was added drop-wise over 20 minutes. Stirring was continued for 45 minutes after addition was completed, the mixture being maintained below 10°C throughout this period. The reaction mixture was decanted into a 4-liter beaker containing approximately 1.5 kg of cracked ice and neutralized by addition of 425 ml saturated (50 percent) sodium hydroxide.

The mixture was transferred to a 4-liter separatory funnel and the aqueous phase separated and discarded. The ether phase was washed twice with 1-liter portions of water and then dried over anhydrous sodium sulfate. The dried ether solution was filtered through paper and the ether was removed by distillation from the reaction mixture. Unreacted n-butylferrocene (b.p. 75°C at 0.5 torr) was distilled from the crude reaction products under vacuum. Conversion of n-butylferrocene to crude product was 55 percent.

The crude product was distilled in a wiped-film molecular still. The distilled product (b.p. 200 C/0.3 torr) was a mobile liquid consisting primarily of dimeric species with some trimer and containing 22.2–22.5 percent iron. Corrected yield was 50 percent on the basis of reacted n-butylferrocene. The residue was a viscous liquid, consisting primarily of trimeric species with some higher polymeric species, containing 21.8–22.0 percent iron.

The crude reaction products had an average molecular weight of 779 ±10. The distillate had an average molecular weight of 514 ±10 and the residue had an average molecular weight of 940 ±10. The crude, distillate and residue were all miscible in all proportions in carboxyterminated polybutadiene at room temperature of about 70°F.

The three forms of the novel combustion catalyst (crude, distillate and residue) were evaluated and compared to prior art catalysts in the following propellant formulation:

TABLE I

| Ingredient | Concentration % Weight |
|---|---|
| Carboxy-terminated polybutadiene Thiokol HC-434 | 11.35 |
| Tris-[1-(2-methyl)aziridinyl] phosphine oxide (MAPO) | 0.65 |
| Dioctyl adipate + combustion catalyst | 5.00 |
| Ammonium perchlorate | 83.00 |

The propellants were cast in the form of internal-burning, cylindrical grains of 2 inches in length, 0.70 inches O.D. and 0.30 inches I.D., containing approximately 31 grams of propellant. After curing for five days at 160°F, the grains were fired in a rocket micromotor. Each formulation was tested by at least four rocket motor firings covering the chamber pressure range of 500 to 1500 psia. By interpolation of the resulting data, the burning rates at 1000 psia shown in Table II below were determined:

TABLE II

| Catalyst | | Burning Rate |
|---|---|---|
| Type | Concentration, %w | in./sec at 1000 psia |
| None | — | 0.36 |
| Crude | 1.0 | 0.75 |
| Distillate | 1.0 | 0.68 |
| Distillate | 3.0 | 0.96 |
| Residue | 1.0 | 0.77 |
| Residue | 3.0 | 0.90 |
| Ferrocene | 1.0 | 0.62 |
| Ferrocene | 3.0 | 0.82 |
| n-Butylferrocene | 1.0 | 0.68 |
| n-Butylferrocene | 3.0 | 0.82 |
| Dimethylferrocene | 1.0 | 0.56 |
| Dimethylferrocene | 3.0 | 0.86 |

EXAMPLE II

A mixture of 214 gm (1 mole) 1, 1'-dimethylferrocene, 22 gm (0.5 mole) acetaldehyde and 222 ml (4 moles) concentrated sulfuric acid (Sp. Gr. 1.84, 18 molar) was reacted in 750 ml anhydrous ether under conditions identical to those of Example I. Neutralization, washing and ether removal were performed as described in Example I. Unreacted dimethylferrocene (b.p. 75°C at 1 torr) was distilled from the crude reaction products under vacuum. Conversion of dimethylferrocene to crude product was 60 percent.

The crude product was distilled in a wiped-film molecular still. The distilled product (b.p. 175°–200°C/0.03 torr) was a mobile liquid consisting primarily of dimeric species and containing 24.3–24.6 percent iron. The residue was a viscous liquid, consisting of trimeric and higher polymeric species, containing 23.8–24.0 percent iron.

All three forms of the product were totally miscible in carboxyterminated polybutadiene at room temperature of about 70°F.

The crude product was evaluated ballistically in the manner described in Example I. With 1 percent by weight of the crude product in the test propellant, the burning rate was found to be 0.69 in./sec. at a chamber pressure of 1000 psia.

EXAMPLE III

The migration rate from a binder of the material of this invention was compared with the migration rate of a prior art liquid ferrocene derivative, n-butylferrocene in the following manner. Plugs of HC-434 cured with MAPO and containing 4.8 percent of the combustion catalysts and 84 percent inert solids were vacuum cast and cured against white polyethylene plugs in 1' I.D. glass cylinders. Migration of the catalysts was observed by discoloration of the polyethylene. After cure at 160°F for 72 hours, the samples were allowed to cool to room temperature.

After standing for five days at 70°F, the discoloration of the polyethylene in the samples was compared. The sample containing the distillate of Example I was discolored to a depth of about 1.75 mm. The sample containing n-butylferrocene was discolored to a depth of about 3.75 mm.

EXAMPLE IV

Samples of propellants containing the distillate of Example I and the prior art n-butylferrocene were evaluated to determine weight loss and iron loss by being maintained at 80°F and a pressure of about $10^{-6}$ torr for 185 hours. The compositions and results are shown in Table III.

TABLE III

|  | Weight % | |
|---|---|---|
|  | Sample A | Sample B |
| Binder | 11.0 | 11.0 |
| Aluminum | 16.0 | 16.0 |
| Ammonium Perchlorate | 68.0 | 68.0 |
| n-Butylferrocene | 0.0 | 0.0 |
| Distillate of Example I | 5.0 | 0.0 |
| Weight Loss | 0.98 | 3.95 |
| Iron Loss | 0.00 | 81.5 |

As can be seen from Table III, Sample A exhibited a weight loss substantially less than that exhibited by Sample B. Of greater significance, however, is the fact that no iron loss was noted in Sample A which indicates that the weight loss was due to volatile constituents in the propellant rather than to the catalyst. Sample B, however, lost 81.5 percent of its iron content which would seriously affect the ballistic characteristics of the propellant.

PREPARATION BY FREE RADICAL COUPLING

The materials of this invention may also be prepared by free radical coupling of an alkyl substituted ferrocene. A preferred method of this type of synthesis is lithiation of an alkyl substituted ferrocene followed by treatment with a transition metal or transition metal salt as illustrated by the following reaction sequence, wherein $n$ is equal to $p + 2$ and $p$ is preferably 0. Suitable transition metals or metal salts in addition to cobaltous chloride are those known to the art to be used in the conventional Grignard reaction and are disclosed in M. S. Kharasch and O. Reinmuth, "Grignard Reactions of Nonmetallic Substances," Prentice-Hall, New York, 1954. For lack of a better generic term, these materials will be referred to hereinafter as "Grignard reactants."

metalation with alkali metals other than lithium such as, for example, sodium or potassium could also be employed in the synthesis.

A different synthetic approach that should be likely to produce the desired product is the generation of active free radicals, for instance, by thermal decomposition of an organic peroxide in the presence of an alkyl substituted ferrocene. Attack of the initiating radicals on the substituted ferrocene would be expected to generate substituted ferrocenyl derivatives which would be then expected to couple or attack other molecules of substituted ferrocene to form the desired products.

The preparation and use of the materials of this invention will be apparent from the following examples.

EXAMPLE V 38.4 gms (0.2 moles) n-butylferrocene was dissolved in 100 ml anhydrous diethyl ether in a 250 ml 3-necked round-bottom flask containing a magnetic stirring bar. The flask was fitted with a reflux condenser, a gas inlet tube and a rubber septum and then purged with dry nitrogen for 15 minutes. Using a hypodermic syringe, 12.8 gms (0.2 moles) butyllithium was added through the rubber septum. The contents of the flask were stirred for 20 hours at ambient temperature. The rubber septum was removed and a flask containing 26 gms (0.2 moles) of anhydrous cobaltous chloride was connected by means of a short piece of rubber tubing. Cobaltous chloride was then added slowly to the reaction mixture. The ensuing reaction was sufficiently vigorous to cause the ether to reflux. The reaction mixture was then heated for 45 minutes at reflux temperature.

The reaction mixture was decanted onto ice and 25 ml (0.3 moles) concentrated hydrochloric acid (Sp. Gr. 1.18) was added. The mixture was transferred to a separatory funnel and the aqueous phase discarded. The ether phase was washed first with 200 ml saturated aqueous sodium carbonate and then twice with distilled water. The ether solution was dried over anhydrous sodium sulfate and then filtered.

The ether was evaporated on a steam bath and unreacted n-butylferrocene removed by distillation under reduced pressure. The nonvolatile liquid residue

REACTION SEQUENCE:

1.  $RR'R''C_{10}H_7Fe$ + $C_4H_9Li$ → $RR'R''C_{10}H_6FeLi$ + $C_4H_{10}$
    Alkylferrocene    Butyllithium    Lithiated Alkylferrocene    Butane

2.

$n(RR'R''C_{10}H_6FeLi) + \tfrac{1}{2}nCoCl_2 \longrightarrow$

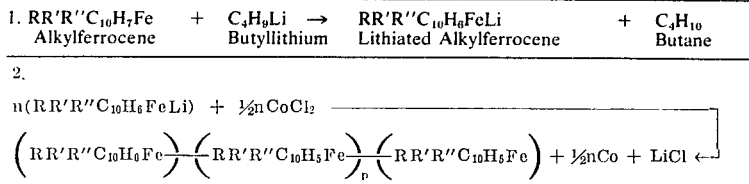

$+ \tfrac{1}{2}nCo + LiCl$

The product produced from the above reaction consists essentially of dimer with only minor amounts of trimer and traces of higher molecular weight species. If the product obtained from the above reaction has a viscosity too high for certain applications, it may be subjected to distillation in a molecular still to obtain a fraction which is the low viscosity dimer.

While the above reaction scheme has been found to produce desirable products, there is no reason to expect that other free radical coupling reactions cannot be employed to produce a similar product. For example, the lithiated alkylferrocene employed in reaction 2 could be replaced by an alkylferrocenyl Grignard reagent and it would be expected that this reaction would produce a suitable product. Likewise, it is possible that weighed 7 gms (14 percent), having an iron content of 21.1 percent. The material consisted primarily of dimer with some trimer. The infrared absorption spectrum of the composition thus produced was determined and was characterized by absorption maxima at 760, 835, 930, 1005, 1045, 1110, and 1720 cm$^{-1}$ an absorption shoulder at about 855 cm$^{-1}$ and the absence of an absorption maximum at 725 cm$^{-1}$.

EXAMPLE VI

The reaction was conducted as in Example V, except that 42.8 gms (0.2 moles) of dimethylferrocene was substituted for n-butylferrocene. The yield was 6 gms (14 percent) having an iron content of 25 percent. The material consisted essentially of dimer with some trimer.

EXAMPLE VII

The combustion catalysts produced according to Examples V and VI were evaluated and compared to prior art combustion catalysts in the following propellant formulation.

TABLE IV

| Ingredient | Concentration of Weight |
| --- | --- |
| Carboxy-terminated polybutadiene, Thiokol HC-434 | 11.35 |
| tris-[1-(2-Methyl)aziridinyl] phosphine oxide (MAPO) | 0.65 |
| Dioctyladipate + combustion catalyst | 5.00 |
| Ammonium perchlorate | 83.00 |

The propellants were cast in the form of internal-burning, cylindrical grains of 2 inches in length, 1.10 inches O.D. and 0.70 inches I.D., containing approximately 31 grams of propellant. After curing for five days at 160°F, the grains were fired in a rocket micromotor. The results of the firing are shown in Table V.

TABLE V

| Type | CATALYST Concentration | Burning Rate in/sec at 100 psia |
| --- | --- | --- |
| None | — | 0.36 |
| Ferrocene | 1.0 | 0.62 |
| n-Butylferrocene | 1.0 | 0.68 |
| Dimethylferrocene | 1.0 | 0.56 |
| Example 1 | 1.0 | 0.64 |
| Example 2 | 1.0 | 0.69 |

As can be seen from Table V the compositions according to this invention are excellent burning rate catalysts and produce burning rates equal to and in some cases higher than those obtained by the representative prior art organoiron combustion catalysts. Of greater importance, however, than the combustion activity is the fact that these liquid combustion catalysts are relatively nonvolatile and do not produce the hazardous conditions encountered in the processing of the prior art ferrocene and alkylferrocene combustion catalysts into propellant compositions. Further, when incorporated into propellant compositions, they do not crystallize, and the tendency to migrate or evaporate from the propellant is between 1 and 2 orders of magnitude less than the ferrocene and alkylferrocene catalysts. This use of the instant catalysts substantially reduces the deterioration of the physical and ballistic properties of the propellant during storage.

While this invention has been described with respect to specific examples thereof, the invention should not be construed as limited thereto. Various modifications may be made by workers skilled in the art without departing from the scope of this invention which is limited only by the following claims wherein:

We claim:

1. A noncrystalline, noncrystallizable liquid composition of matter comprising a mixture of polynuclear ferrocene derivatives having the general formula:

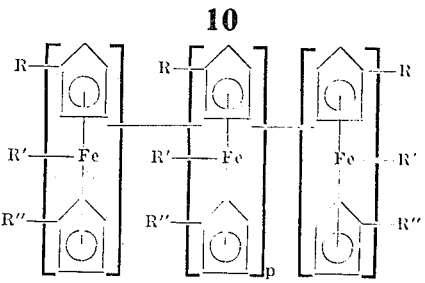

wherein R is a lower alkyl group, R' and R'' are selected from the group consisting of hydrogen and lower alkyl groups, the total number of carbon atoms in R, R' and R'' being from 1 - 6 and p is an integer from 0 - 1.

2. The composition of claim 1 consisting essentially of the species where p equals 0.

3. The composition of claim 1 wherein R is a butyl group and R' and R'' are hydrogen.

4. The composition of claim 1, wherein R and R' are methyl groups and R'' is hydrogen.

5. A composition of matter consisting essentially of a mixture of polynuclear hydrocarbyl substituted ferrocene compounds, at least one of the hydrogen atoms of each ferrocene nucleus being replaced by a hydrocarbyl group, the total number of carbon atoms in the hydrocarbyl groups associated with an individual ferrocene nucleus being in the range of from 1-6, said composition being characterized by being a noncrystalline, noncrystallizable liquid having an average molecular weight no greater than about 950, being miscible in all proportions with carboxyterminated polybutadiene at 70° F and exhibiting activity as a combustion catalyst in a composite solid propellant.

6. The composition of claim 5 consisting essentially of dimeric polynuclear hydrocarbyl substituted ferrocene compounds.

7. The composition of claim 5 consisting essentially of trimeric and higher polynuclear hydrocarbyl substituted ferrocene compounds.

8. The compositions of claim 5 wherein said hydrocarbyl substituent groups are selected from the group consisting of methyl and butyl groups.

9. A noncrystalline, noncrystallizable composition of matter consisting essentially of a mixture of polynuclear ferrocene derivatives having the general formula:

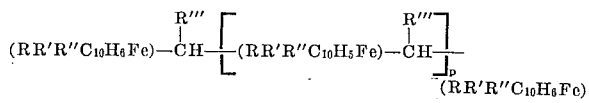

wherein R is a lower hydrocarbyl group, R' and R'' are selected from the group consisting of hydrogen and lower hydrocarbyl groups and the total number of carbon atoms, per ferrocene nucleus contained in R, R' and R'' being from 1-6; R''' is selected from the group consisting of aliphatic groups having from 1-11 carbon atoms and hydrogen, the relationship between the number of carbon atoms per nucleus in R, R' and R'' and number of carbon atoms in an R''' group being such that the sum of twice the number of carbon atoms per nucleus in R, R' and R'' and the number of carbon atoms in an R''' group is no greater than 13; p is an integer from 0-4; and said composition having an average molecular weight no greater than about 950.

10. The composition of claim 9 wherein p is equal to zero.

11. The composition of claim 10 wherein p is equal to one.

12. The composition of claim 9 wherein R is an n-butyl group and R', R" and R''' are hydrogen.

13. The composition of claim 10 wherein R is an n-butyl group and R', R" are hydrogen.

14. A method for producing noncrystalline liquid polynuclear ferrocene derivatives comprising condensing a hydrocarbyl substituted ferrocene, said hydrocarbyl substituent having $m$ carbon atoms, with a material selected from the group consisting of aliphatic aldehydes having $n$ carbon atoms and acetals derived therefrom wherein $m$ is an integer from 1–6, $n$ is an integer from 1–12 and the value of the relationship $2m + n$ is from 3–14, in an inert diluent and in the presence of a catalytic amount of acid at temperatures of no greater than about 10°C.

15. The process of claim 14 further comprising the step of fractionating the condensation product and recovering the low molecular weight fraction.

16. The process of claim 14 wherein said substituted ferrocene is selected from the group consisting of n-butylferrocene and dimethylferrocene.

17. The process of claim 16 wherein said aldehyde is selected from the group consisting of formaldeyhde and acetaldehyde.

18. The process of claim 17 wherein the aldehyde is provided as the acetal.

* * * * *